May 1, 1962     J. S. SPIRA     3,032,688
DIMMING DEVICE

Filed July 15, 1959     3 Sheets-Sheet 1

STEP-100%

2ND STEP

3RD STEP

INVENTOR.
JOEL S. SPIRA

BY *Ostrolenk, Faber,*
*Gerb & Soffen*
ATTORNEYS

May 1, 1962
J. S. SPIRA
3,032,688
DIMMING DEVICE
Filed July 15, 1959
3 Sheets-Sheet 2
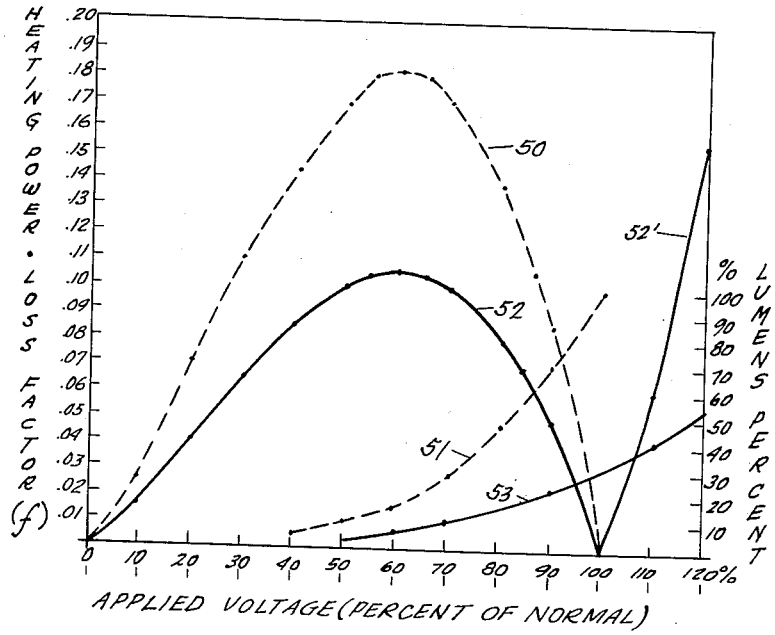
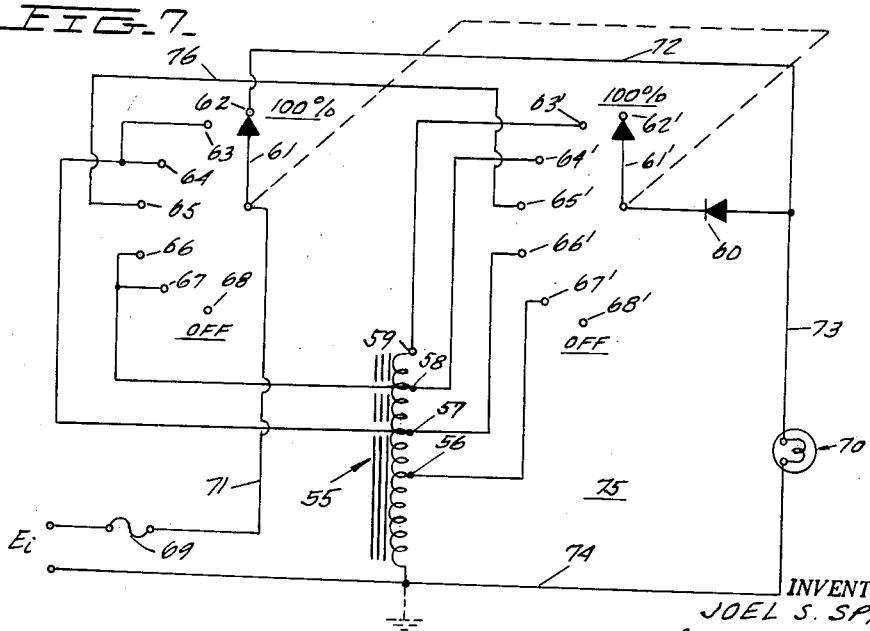
INVENTOR.
JOEL S. SPIRA
BY Ostrolenk, Faber,
Gerb & Soffen
ATTORNEYS May 1, 1962 J. S. SPIRA 3,032,688
DIMMING DEVICE
Filed July 15, 1959 3 Sheets-Sheet 3
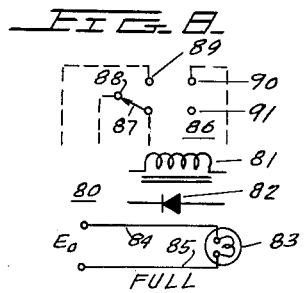
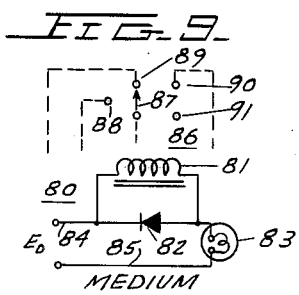
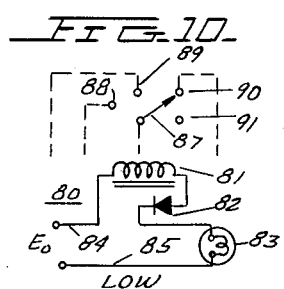
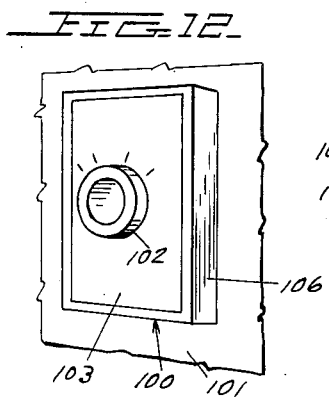
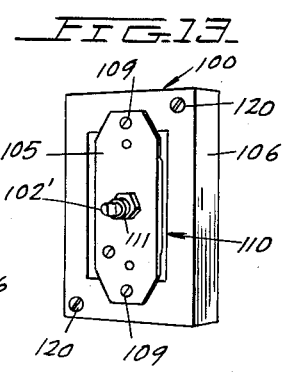
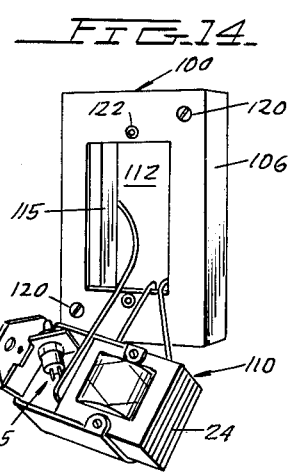
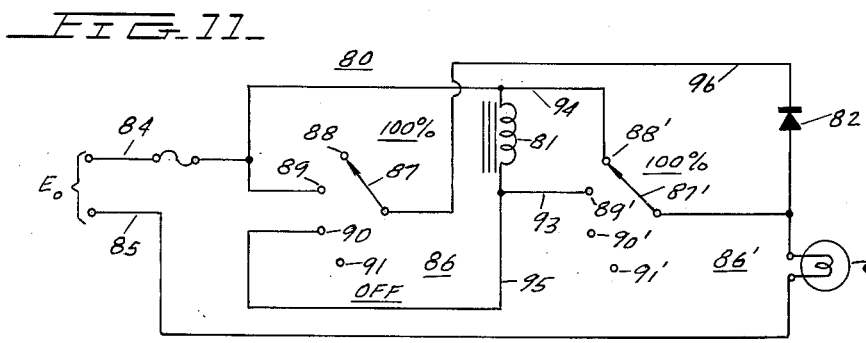
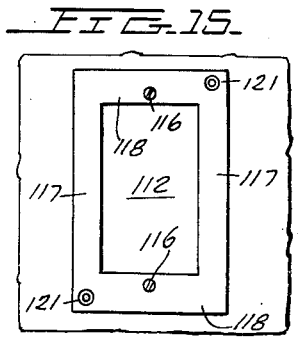
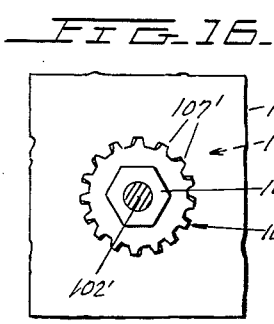
INVENTOR.
JOEL S. SPIRA
BY
ATTORNEYS United States Patent Office 3,032,688
Patented May 1, 1962

3,032,688
DIMMING DEVICE
Joel S. Spira, 180 Riverside Drive, New York, N.Y.
Filed July 15, 1959, Ser. No. 827,232
6 Claims. (Cl. 315—272)

This invention relates to dimming devices, and more particularly relates to novel circuits and apparatus for selectively dimming electric illumination or varying electrical power to a load.

In accordance with my present invention I utilize a diode or rectifier element in conjunction with an inductor or autotransformer, in switching relationship, to effect the dimming or power control. The invention is particularly directed for use in homes or small establishments for controlling light or power to the order of 300 to 500 watts nominal rating. Its principles and features are applicable to larger or smaller wattages. Further, the autotransformer-diode configuration hereof has the feature of giving constant dimming ratios for any load that it controls, from zero to full load.

For dimming home lighting, the invention apparatus is sufficiently small and operates with a sufficiently small temperature rise, to enable safe enclosure in a conventional wall switch junction box. For larger sized dimming devices hereof, a novel switch box extension enclosure is provided that readily fastens to the front of the conventional box. Further details thereof are set forth hereinafter.

Insertion of a diode or half-wave rectifier in series with a lamp load, reduces the power and effective voltage applied to the lamp load to the order of half. However, due to the well known illumination characteristics of electric lamps the lumen output falls to 30% of the full load value. Means are provided by my invention to increase or decrease the voltage applied to the series-connected diode, to thereby correspondingly increase or decrease the output power and voltage applied to the lamps or load. In this manner a greater range of steps or values are afforded in the output than heretofore practical with a diode alone.

In one important form of my invention I use an autotransformer to effect a plurality of dimming steps with a series diode to the load. At the higher value steps I connect the autotransformer in a voltage step-up circuit, for the lower value steps, in a voltage step-down circuit. By such combinations of the diode and the autotransformer a plurality of effective dimming steps are provided, in a smooth transition from full load or lumens to zero. Further, the size, weight, cost and heating factors of the autotransformer are substantially reduced in my invention system using the diode therewith.

In another form of the invention I employ an inductor in place of an autotransformer, in novel circuital combinations with a diode whose polarity is unimportant, for the dimming steps. The autotransformer or inductor, with the diode and a two-pole switch, comprise the essential elements of the present invention. They are effectively combined in novel circuitry and design for small size and relatively low cost compared to prior dimmers. The invention apparatus is effective, foolproof, and gives long service. It lends itself readily to a plural number of smooth dimming or power reducing steps.

It is accordingly an object of my present invention to provide novel dimming and power variation systems.

Another object of my present invention is to provide light dimming apparatus that is compact and of relatively low cost.

A further object of my present invention is to provide dimming apparatus incorporating a diode and autotransformer in circuital combinations with a multi-position switch for smooth dimming steps.

Still another object of my present invention is to provide a novel power varying apparatus composed of a diode and inductor in power varying combinations.

Still a further object of my present invention is to provide novel extension enclosures for securement with mounted conventional junction boxes.

These and other objects of my invention will become apparent from the following description of exemplary embodiments thereof, illustrated in the drawings, in which:

FIGURE 6 is a graph of several curves devoting autotransformer heating and incandescent lamp lumens under various voltage conditions.

FIGURE 7 is a schematic electrical diagram of a modified dimming embodiment with more steps than the form of FIGURE 2.

FIGURES 8, 9 and 10 are schematic circuit diagrams of the operation of the inductor-diode form of the dimmer control.

FIGURE 11 is a front elevation view, in perspective, of an extender box or enclosure for the control of my invention.

FIGURE 12 is a front elevational view, in perspective, of the enclosure of FIGURE 11 with front plate and control knob removed.

FIGURE 13 is a perspective view of the control apparatus and enclosure of FIGURE 11, separated.

FIGURE 14 is an elevational view of the mounting plate of the enclosure of FIGURE 11.

FIGURE 15 is a plan view of the mounting plate of FIGURE 12.

FIGURE 16 shows a fastening arrangement for the cover plate of FIGURE 12.

Figure 1:
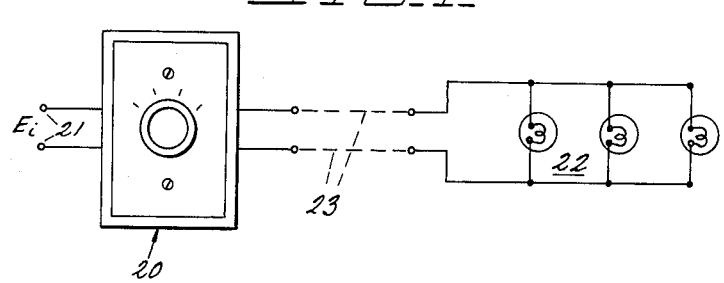
FIGURE 1 is a diagrammatic showing of an exemplary dimming device in circuit with a lamp load.

FIGURE 1 illustrates the simple circuit relation of the invention dimmer device 20 with respect to the input voltage 21 ($E_1$) and a lamp load 22. A simple line pair 23 connects load 22 to the dimmer output 20. The exemplary dimmer 20 is diagrammed in FIGURE 2. The dimmer 20 comprises autotransformer 24 and diode 25 whose polarity is unimportant. A two-pole four position ganged switch 26, 27 operates dimmer 20 from "Off" position 28, 28' to full or 100% position 30, 30'. The two intermediate steps 31, 31' and 32, 32' are arranged to effect a smooth differential light or power transition, as desired, and as described hereinafter. Dimmer 20 may be used for lamp loads (22) or any power load. A fuse 29 or overload device is placed, as indicated.

For lighting, I have ascertained that effective psychological dimming is feasible when the first step decreases the lumens to about 42% of the full or normal, and the second step to about 24%. The third step down is zero or off in the dimmer 20. While I prefer to construct the exemplary dimmer 20 with these stated lumen rations, it is to be understood that other values may instead be used within the principles of my invention. Also more dimming steps are feasible as illustrated in FIGURE 7, and described hereinafter. Further, it is at times advantageous to use the continuously variable type of autotransformer such as one trade-named "Variac" in conjunction with the diode circuit hereof.

It is readily demonstratable that illumination in the range of about 70% upwards, is not readily discernible from the 100% value. Also illumination in the range from 42% upwards to about 60% is not readily distinguishable from the 42% value. This effect is due to the light compensating characteristic of the diaphragm of the eye. While it is true that a change of illumination from 55% to 60% may be perceived, the dramatic and psychological effects are not different by such short change. Fechner in 1858 stated that for a stimulus brightness change from $B_1$ to $B_2$, the sensation change (to eye) is proportional to $\log B_2 - \log B_1$. This law has been found to be valid to about 2% in the general seeing range. My exemplary dimmer 20 uses this principle to proportion the dimming steps, lumenwise, to a relatively constant proportion, namely of about one-half.

Figure 2:
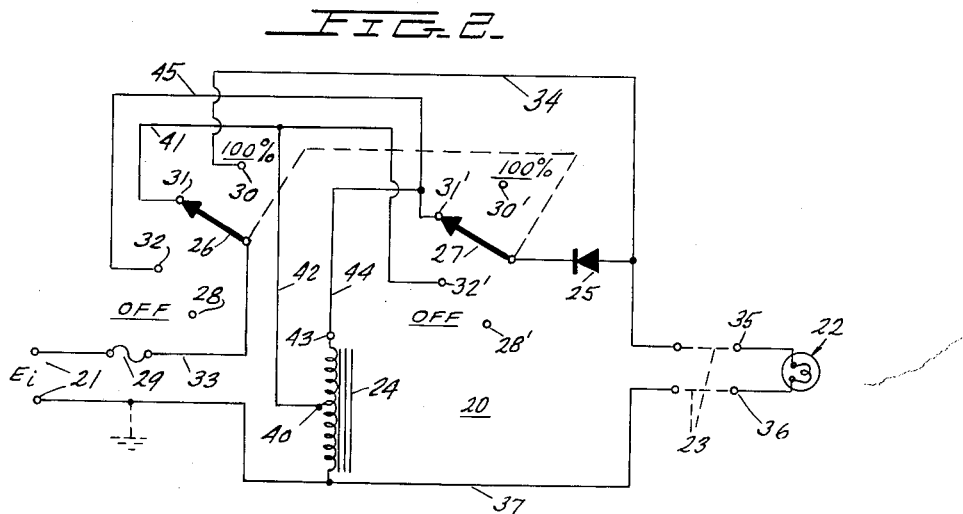
FIGURE 2 is a schematic electrical diagram of the exemplary dimmer.

Towards this end, dimmer 20 is schematically shown in FIGURE 2 with four steps; step 30, 30' for 100%; step 31, 31' for 42%; step 32, 32' for 24%; and step 28, 28' for zero or "off." Other intermediate lumen output ratios for steps 31, 31' and 32, 32' may of course be used. I have found these enumerated ratios to effect a smooth pleasant sensory dimming action for a four position dimmer. At the maximum output position, for 100% lumens, the switch arms 26, 27 contact respectively at 30, 30'. Input lead 33 is thereupon connected by lead 34 directly to terminal 35 of lamp load 22 to complete its circuit from terminal 36 to input supply $E_i$ through return 37.

Figure 3:
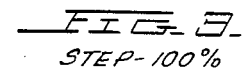
FIGURES 3, 4 and 5 are schematic electrical circuits of the active steps of the dimmer of FIGURE 2.
Figure 3:
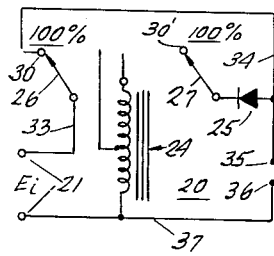
Figure 4:
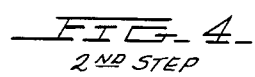
Figure 4:
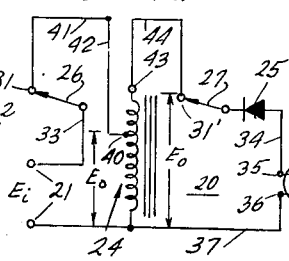

FIGURE 3 illustrates such 100% full step 30, 30' connection of dimmer 20. It is noted that diode 25 remains unconnected, as is autotransformer 24, in this position. This is the normal or full power connection to lamp load 22, or to another load that is used instead. The second position 31, 31' is illustrated in FIGURE 4 schematically, also as indicated in FIGURE 2. The input lead 33 is connected to tap 40 of autotransformer 24 through leads 41, 42. Outer terminal 43 of autotransformer 24 is thereupon connected by lead 44 to contact 31' and diode 25 through switch arm 27, and thence to load terminal 35.

It is noted that for the second step, FIGURE 4, the autotransformer 24 is connected as a voltage step-up unit, with outer tap 43 at a predetermined higher voltage $E_o$ than the input voltage $E_i$. This higher voltage $E_o$ is then applied to diode 25 in series with lamp load 22. The diode 22 rectifies the alternating voltage $E_o$, e.g. at sixty cycles, by the usual rectifier action. Were the normal input $E_i$ voltage rating, e.g. 120 volts instead applied directly to diode 25, the illumination level of lamp load 22 in series therewith would be 30%, a value too low for the intended 42% for this position (31, 31').

It is an important feature of my present invention to control the illumination level or applied power to a load to practical desired degrees by using an autotransformer (24) in combination with a rectifier or diode (25). Thus, by connecting autotransformer 24 in a step-up mode to apply a raised voltage ($E_o$) to dode 25, I provide the desired 42% illumination level for the second step. To achieve the 42% illumination level, the tap 40 on autotransformer 24 is arranged to yield about 130 volts at terminal 43 for voltage $E_o$ to diode 25. For another desired illumination level that is above 30%, a correspondingly different output voltage ($E_o$) is used by arrangement of the tap 40, as will be set forth in more detail hereinafter.

Figure 5:
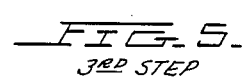

The third step is schematically illustrated in FIGURE 5, with ganged switch arms 26, 27 on contacts 32, 32'. In this position the input A.C. voltage $E_i$ is applied to outer terminal 43 of autotransformer 24 through contact 32 and leads 45 and 44. The autotransformer thus is connected in a voltage step-down mode, with tap 40 yielding an output voltage $E_2$. This output voltage $E_2$ is applied to diode 25 through leads 42, 46, contact 32' and switch arm 27. The stepped-down voltage $E_2$ is inversely related to the inverse connection of autotransformer from its step-up ration $E_o/E_i$, as the same terminals 40, 43 are used. This third position yields the desired 24% illumination level at lamp load 22, as will be set forth. In this case voltage $E_2$ is about 110 volts for a 120 volt value of $E_i$.

Reference is made to the curves of FIGURE 6. Curve 50 shows the heating relation of an autotransformer feeding an incandescent lamp load over an operating range of zero to 100% of the normal applied voltage. The autotransformer heating loss factor ($f$) is the ordinate. The maximum autotransformer heating results with voltage output in the 50 to 60 percent range, decreasing towards zero and 100 percent voltage outputs. The wattage loss in the transformer equals the factor ($f$) times the wattage load, times the transformer efficiency. This relation, namely curve 50, is well known in the art. Correspondingly, the percent lumens output or illumination level of a light load connected to such autotransformer, directly to the lamp load with a series diode, is illustrated by curve 51.

In accordance with my invention hereof, a diode or rectifier (25) is connected between the autotransformer (24) output and the lamp load (22), such as per FIGURES 2, 4 and 5 described hereinabove. Curve 52 of FIGURE 6 shows the heating factor of the autotransformer 24 thus connected with series diode (25). The peak factor ($f$) at mid-voltage of curve 52 is about .106, as compared with .180 without the diode (curve 50), thus being a much more efficient relationship between zero and 100% voltage output. As we also utilize a greater than 100% output ($E_o$) for the second step (FIGURE 4), the curve portion 52' for the range 100% to 120% shows the heating factor therefor. It is noted that at about the 115% point the heating factor equals that of the mid-voltage region. Curve 53 illustrates the illumination level or percent lumens for the voltage output range corresponding to curves 52, 52'.

The amount of autotransformer heating is an important factor in its size and design, and its application in light switch boxes is limited by Fire Underwriters standards. From curves 52', 53, it is noted that factor ($f$) is .156 for a lumen level of 57% (at 120% voltage). At the desired 42% lumens for the exemplary second step (FIGURE 4), the corresponding factor ($f$) is .06 (at 110% voltage). The heating factor ($f$) is thus seen to be 250 percent higher for the 120% voltage ($E_2$) to yield 57% lumens, than for 110% voltage to yield the desired 42% lumens.

As a practical matter, the lumen step from full 100% to 42% is perceived smoothly as a second step as stated above. Thus, the 57% is not required, and a simpler, smaller, less costly system results. As the heating of the autotransformer goes up, the transformer size need be increased to maintain allowable limits of temperature rise. The exemplary steps of 100%, 42%, 24% permit the transformer to fit into a standard switch box for a lamp load rating of about 380 watts. The 24% lumen output, referred to curve 53 indicates a 92% voltage used, and a modest .04 factor ($f$). In practice slightly different voltages result due to the same autotransformer 24 being used in its step-up mode for the second step at 42%, and the step-down mode for the third step 24%, with common terminals 40, 43. The curves 52, 52', 53 are theoretically derived and found to be close to the practical.

It is clear at this point that the essence of my invention is the use of intermediate power or lamp (22) load output steps by reversing the autotransformer (24) mode between step-up and step-down through a diode rectifier (25). For lamp loads (22) the perceptive relation, for a relatively constant dimming proportion of about one-half, is accomplished by my invention with moderate deviations of voltage output from the 100%. The second step (42%) is accomplished at the 110% voltage; the third step (24%) at 92% voltage. The heating factor ($f$) is relatively low and practical, namely below .045 in both cases.

The combination autotransformer (24) and diode (25) hereof results in a heating effect or factor ($f$) of 58.5% less (curve 52) than that of an autotransformer alone (curve 50). For a given percent lumen, the factor ($f$)

and the consequent volume and weight reduction are even more significant. The volume and weight ratio of the autotransformer-diode combination to autotransformer alone is equal to the (f) ratios of each. The following table demonstrates these relationships.

| Percent Lumens | Heating Factor (f) | | A.-Trans. Volume and Weight Ratio |
|---|---|---|---|
| | A.-Trans. Alone | A.-Trans.-diode | |
| 42% | A.—.15 | A.—.06 | .4 |
| 25% | .175 | .035 | .2 |
| 10% | .176 | .097 | .55 |

The autotransformer-diode dimmer combination hereof enables a substantially smaller and less expensive device for a given range of light or power load control than with autotransformer alone.

FIGURE 7 illustrates a modified form of my invention with five intermediate power or lumen level steps. Autotransformer 55 has three intermediate taps 56, 57, 58, and an outer terminal 59. The diode 60 (with its polarity unimportant), is connectible in various voltage step-up and step-down ratios, to be described, for effecting a seven step control. Ganged switch arms 61, 61' coact with two sets of seven contacts 62—62', 63—63', 64—64', 65—65', 66—66', 67—67', 68—68'. A fuse 69 or overload protector is used in line 71.

The circuit of FIGURE 7 shows arms 61, 61' in the full or 100% position at contacts 62, 62', with line voltage $E_1$ connected directly to load 70 through leads 71, 72, 73. The return is lead 74. Five intermediate control positions interconnect autotransformer 55 and diode 60 between leads 71 and 73 to load 70. Exemplary illumination levels for the seven positions of the dimmer control 75 of FIGURE 7 are: 100%, 70%, 40%, 30%, 20%, 12% and zero. It is obvious that other graduations are feasible, and that more or less than the indicated five intermediate control positions may be employed within the principles of my invention.

For illumination levels at lamp load 70 greater than 30%, the autotransformer 55 is connected in a step-up mode for diode 60. This occurs in dimmer 75 at step 63, 63' for 70%, and step 64, 64' for 40%. At central step 65, 65' for 30% the direct input voltage $E_0$ is applied to diode 60 across lead 76. For step 66, 66' at 20% and step 67, 67' at 12% the autotransformer is used in its voltage step-down mode for diode 60. Different voltage ratios may be desirable where control 75 is designed for a power load rather than for practical perceptive illumination changes. In effecting the 70% (step 63, 63') and 12% (step 67, 67') operations in dimmer 75, we depart further from unity turns ratio of the autotransformer 55 as compared with the 40% (step 64, 64') and 20% (step 66, 66') operations. More heating therefore occurs during the 70% and 12% steps for this reason.

A modified dimming apparatus 80 using an inductance 81 in conjunction with a diode rectifier 82 is schematically illustrated in FIGURES 8, 9 and 10. The circuit of FIGURE 8 connects lamp load 83 in "Full" to applied A.C. line voltage $E_0$ by leads 84, 85. The inductance 81 and diode 82 are out of circuit in the "Full" position. For "Medium" illumination output, load 83 is connected as shown in FIGURE 9, with inductance 81 in parallel with diode 82, and both in series with voltage $E_0$ through lead 84. As noted hereinabove a diode (82) alone between line ($E_0$) and load (83) gives an illumination level of about 30%. The parallel inductor 81 across diode 82 passes additional power to load 83 and thus gives a somewhat higher output than the 30%. In the "Low" position of FIGURE 10, the inductance 81 is in series with diode 82, and acts as an impedance that drops the overall result at lamp load 83 below the 30%. A suitable ganged two-arm (87) four-position (88, 89, 90, 91) switch (86) readily enables a uni-control circuit action for the three positions per FIGURES 8, 9, 10 and "off." Using a tapped inductor would afford more power positions where desired.

FIGURE 11 is a circuit diagram of untapped inductor 81 and diode 82 with two-arm switch 86, 86' to effect the schematically shown operational modes of FIGURES 8, 9, 10. The "off" position 91, 91' is with the components unconnected. The "Full" or 100% position 88, 88' as illustrated has lead 94 directly connected from line 84 to contact 88', and through arm 87' to lamp load 83, and returned through line 85. The "Medium" position 89, 89' corresponding to FIGURE 9 connects diode 82 to line 84 through contact 89, and inductor 81 in parallel therewith through lead 93 and contact 89'. The "Low" position 90, 90' corresponding to FIGURE 1 connects the diode 82 in series with inductor 81 through contact 90 and leads 95, 96.

FIGURE 12 is a perspective view of an extender box or enclosure 100 used for a dimmer control or other enclosable apparatus that is physically too large for a conventional or standard size wall switch box. The extender box 100 projects pleasantly from the wall 101, fully enclosing such apparatus, and hiding the wall switch box opening underneath. The multi-position control knob 102 is mounted on a control shaft 102' (FIGURE 13), and is in front of cover plate 103 of enclosure 100. Cover or switch plates 103 is secured against interior plate 105 and the face of frame 106. This may be accomplished by the use of machine screws through apertures in cover plate 103 and coacting threads in plate 105. However, I utilize a novel and more esthetic method.

Enlarged FIGURE 16 illustrates the latter cover plate 103 fastening arrangement. A washer 107 is placed against cover plate 103 and over control shaft 102'. A nut 108 is threaded on shaft 102' and presses washer 107 firmly against cover plate 103 the edge of which in turn presses in position against frame 106. An important feature of washer 107 is the use of radially extending teeth 107' along its outer periphery. Teeth 107' preferably have partially twisted sharp edges or points in the manner of lock-washers, and dig against the cover plate 103 to keep it in firm position when set. The control knob 102, indicated dotted in FIGURE 16, and seen in FIGURE 12, is recessed to accommodate washer 107 and nut 108, and hide them underneath.

FIGURES 13, 14 illustrate the extender box 100 with knob 102 and cover plate 103 removed. The box-like frame 106 supports plate 105 through mounting screws 109, 109 which engage threads 122, 122. The control assembly 110 is supported on inside surface of plate 105 through screw washer 111 on the sleeve of control shaft 102'. The diode (25), autotransformer (24) and fusing (29) of the control assembly (110) are mounted or suitably bracketed to plate 105. This is the physical embodiment of the dimmer system 20 of FIGURES 2 through 5. The control assembly 110 fits within the interior of frame 106, that is made substantially larger in volume than the switch box over which it is mounted. FIGURE 14 shows control apparatus 110 outside of extender box 100, and the interior open space 112 in the interior switch box for wiring junctions, etc. Also seen is an edge portion of the mounting plate 115 for frame 106.

FIGURE 15 is a plan view of the mounting plate 115 in position flush against wall 101. Plate 115 is supported against the outer edges of the interior switch box already in wall 101 (not shown) through screws 116, 116 threading in the apertures conventionally provided by the switch boxes for mounting switches. Extender mounting plate 115 is composed of an essentially flat square frame with parallel vertical sides 117, 117 and joining the horizontal ones 118, 118. Raised nuts 121, 121 are vertically supported above plate 115. The shanks of machine screws 120, 120 (see FIGURES 13, 14) engage nuts 121, 121 and the heads of screws 120, 120 bear against the top of frame 106 to secure it to plate 115. The frame 106 overlaps mounting plate 115 so as to hide it from view, and the frame edges are contiguous with wall 101.

Although the present invention has been described in connection with exemplary embodiments, it is to be understood that modifications and variations thereof, as to circuitry, structure or utilization, are feasible that fall within the broader scope of the invention as set forth in the following claims.

I claim:

1. An electrical control for an electric load comprising an autotransformer, a diode rectifier and switching means including circuit connections with said autotransformer and said diode rectifier for providing voltages in predetermined magnitudes to said load bearing predetermined voltage ratios to an applied voltage source; said autotransformer being interconnected by the switching means in its voltage step-up mode for the diode rectifier to establish an intermediate magnitude for the load that is higher than that by connecting the applied voltage source directly to the diode.

2. A power control of the character described comprising an autotransformer, a rectifier and switching means including circuit connections with said autotransformer and said rectifier for providing power to a load bearing predetermined power ratios to an applied power source; said autotransformer being interconnected by the switching means in its voltage step-up mode for the rectifier to establish a second ratio for the load that is higher than that by connecting the applied power source directly to the diode alone and in its voltage step-down mode to establish a third ratio that is lower than that to the diode alone.

3. A dimmer control for an electric lamp load comprising an autotransformer with two outer terminals and an intermediate tap, a diode, and switching means including circuit connections with said autotransformer terminals and tap and said diode for providing lumen output in predetermined steps; said autotransformer terminals and tap being interconnected by the switching means in its voltage step-up mode for the diode to establish an intermediate lumen step for the lamp load that is higher than that by the diode alone.

4. A dimmer control for an electric lamp load comprising an autotransformer with two outer terminals and an intermediate tap, a diode, and switching means including circuit connections with said autotransformer terminals and tap and said diode for providing lumen output in predetermined steps; said autotransformer terminals and tap being interconnected by the switching means in its voltage step-up mode for the diode to establish a second lumen step for the lamp load that is higher than that by the diode alone and interconnected in its voltage step-down mode to establish a third lumen step that is lower than that by the diode alone.

5. An electrical control for an electric load of the character described comprising an autotransformer with two outer terminals and intermediate taps, a diode rectifier, and switching means including circuit connections with said autotransformer terminals and taps and said diode rectifier for providing voltages to said load bearing predetermined ratios to an applied voltage source; said autotransformer terminals and taps being interconnected by the switching means in voltage step-up modes for the diode rectifier to establish voltage output steps for the load that are higher than that by the diode alone.

6. An electrical control for an electric load of the character described comprising an autotransformer with two outer terminals and intermediate taps, a diode rectifier, and switching means including circuit connections with said autotransformer terminals and taps and said diode rectifier for providing voltages to said load bearing predetermined ratios to an applied voltage source; said autotransformer terminals and taps being interconnected by the switching means in voltage step-up modes for the diode to establish output voltage steps for the load that are higher than that by the diode alone and interconnected in voltage step-down modes to establish intermediate output voltage steps that are lower than that by the diode alone.

References Cited in the file of this patent

UNITED STATES PATENTS

| | | |
|---|---|---|
| 2,418,687 | Arnesen | Apr. 8, 1947 |
| 2,715,197 | Dubroff et al. | Aug. 9, 1955 |
| 2,819,331 | Bladh | Jan. 7, 1958 |
| 2,829,314 | Vradenburg | Apr. 1, 1958 |
| 2,896,125 | Morton | July 21, 1959 |